A. W. SHEPHERD.
FLEXIBLE SHAFT COUPLING.
APPLICATION FILED FEB. 1, 1919.
Patented Nov. 11, 1919.
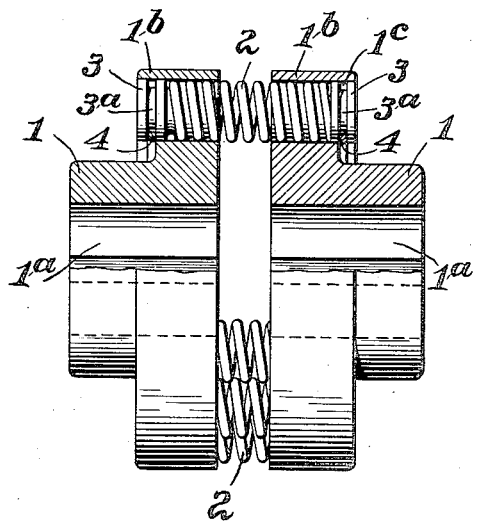
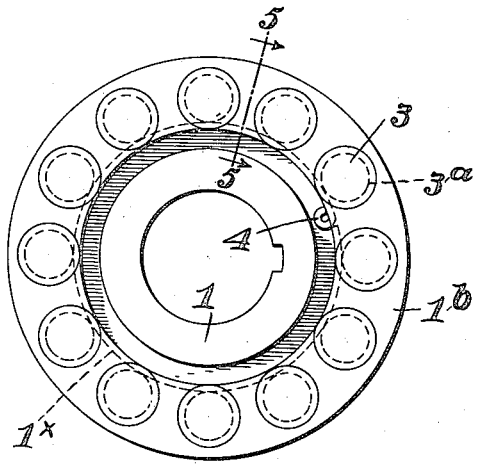
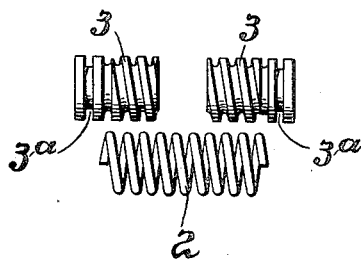
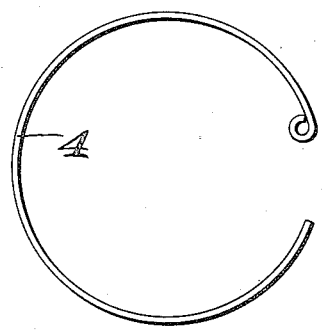
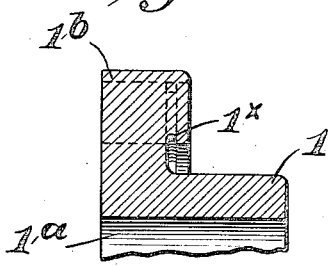
Inventor:
Alfred Willard Shepherd,
by Huar Middleton Donaldson Shear
Atty's A. W. SHEPHERD.
FLEXIBLE SHAFT COUPLING.
APPLICATION FILED FEB. 1, 1919.
1,321,249.
Patented Nov. 11, 1919.
2 SHEETS—SHEET 2.
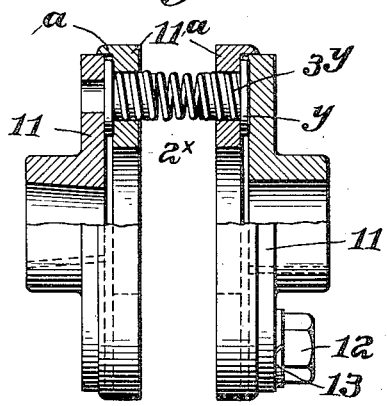
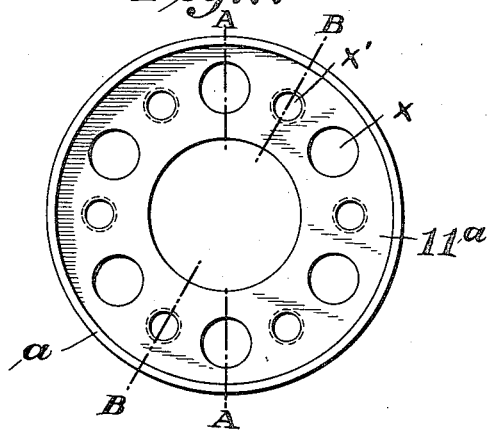
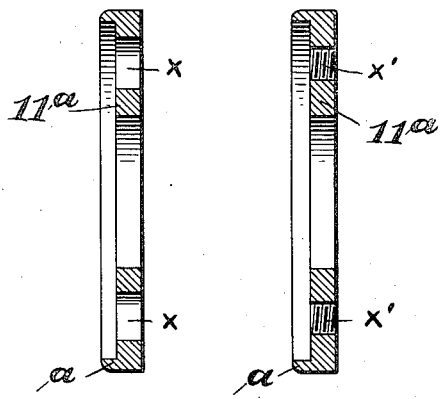
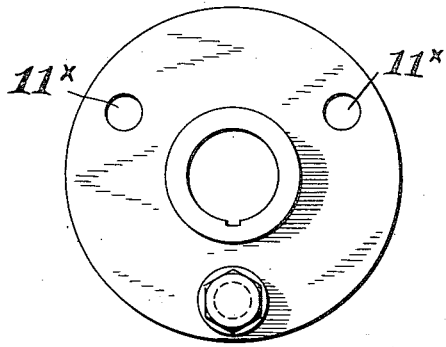
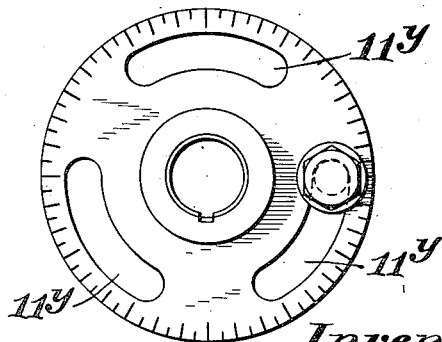
Inventor:
Alfred Willard Shepherd,
by Spear Middleton Donaldson Spear
Attys.

UNITED STATES PATENT OFFICE.

ALFRED WILLARD SHEPHERD, OF EAST ORANGE, NEW JERSEY.

FLEXIBLE SHAFT-COUPLING.

1,321,249. Specification of Letters Patent. Patented Nov. 11, 1919.

Application filed February 1, 1919. Serial No. 274,520.

*To all whom it may concern:*

Be it known that I, ALFRED WILLARD SHEPHERD, a citizen of the United States, resident of East Orange, New Jersey, have invented certain new and useful Improvements in Flexible Shaft-Couplings, of which the following is a specification.

My present invention relates to improvements in flexible shaft couplings and aims to provide a simple, economical and durable construction which will provide in the most efficacious manner for the various relative movements of such a device.

With these and other objects in view the invention includes the novel features of construction and arrangement and combination of parts hereinafter described and particularly defined by the appended claims.

An embodiment of my invention is illustrated in the accompanying drawings in which:—

Figure 1 is a part sectional view and part side elevation of a coupling constructed in accordance with my invention.

Fig. 2 is an end view.

Fig. 3 is a view of one of the coupling springs and the two coöperating holding plugs or members separated.

Fig. 4 is a detail view of the locking ring.

Fig. 5 is a sectional detail on line 5—5 of Fig. 2.

Fig. 6 is a view similar to Fig. 1 but illustrating a modification.

Fig. 7 is a face view of one of the head rings.

Figs. 8 and $8^a$ are sections on lines A—A and B—B of Fig. 7.

Fig. 9 is a face view of one of the main heads, and,

Fig. 10 is a similar view illustrating a further modification.

Referring by reference characters to the drawings and first to the form shown on Sheet 1, the numerals 1, 1, designate a pair of similar coupling heads designed to be connected to the ends of the shafts to be coupled in any suitable manner, as by means of central openings $1^a$ in the central portions or hubs of the heads. The outer annular portions of the coupling heads are preferably in the shape of annular flanges $1^b$ which are provided each with a plurality of annularly arranged cylindrical openings $1^c$.

The means for flexibly connecting the flanges comprises a plurality of coiled springs 2 having their opposite ends seated in the respective alined openings in the flanges.

In order to hold the ends of the springs in the openings I provide a pair of plugs 3 for each spring, these plugs having helical grooves or threads corresponding to the convolutions of the spring whereby a pair of plugs may be screwed into each spring from opposite ends.

Each plug is provided near its outer end with an annular groove $3^a$, and after all the plugs with the springs thereon have been inserted in the respective openings in the adjacent opposed flanges they are locked therein by the locking rings, each ring engaging a portion of the groove $3^a$ of each and all of the corresponding plugs, and engaging corresponding grooves $1^x$ in the flanges.

It will be seen that my improved coupling is capable of being very expeditiously assembled and disassembled, and that it affords a very strong, durable and resilient connection. When the shafts are at an angle part of the springs constituting the connecting links are compressed while others are extended. When the shafts are parallel but not in axial alinement all of the springs will be distorted in the direction of non-alinement.

In the form shown in Figs. 6 to 10 I form each coupling head in two parts comprising a main head or a member 11 and a head ring $11^a$ which are held in concentric relation by means such as an annular flange $a$ on one overlapping the periphery of the other. In this form the ends of the springs $2^x$ are seated in openings $x$ in the head rings and the screw plugs $3^y$ have flat heads $y$ against which the faces of the sections 11 bear.

The head sections 11 and head rings $11^a$ are secured together by screw bolts 12 passing through openings $11^x$ in the head sections 11 and engaging threaded openings $x'$ in the head rings.

The bolts are preferably provided with lock washers 13.

To provide for adjustment of the heads with relation to each other one or both of the head rings may be made adjustable with relation to its head section by making the bolt openings in the shape of arc shaped slots, $11^y$ permitting the coupling head to be rotatably adjusted.

What I claim is:—

1. A shaft coupling comprising two coupling heads, and a plurality of helical springs having their ends rigidly held in annularly arranged recesses in the coupling heads.

2. A shaft coupling comprising two coupling heads, and a plurality of annularly arranged coiled springs having their ends removably and rigidly locked in annularly arranged recesses in the coupling heads.

3. A shaft coupling comprising two coupling heads having annularly arranged cylindrical openings, a plurality of helical springs, plugs screwed into the ends of said springs and seated in said openings and means for locking the plugs in place.

4. A shaft coupling comprising two coupling heads having annularly arranged cylindrical openings, a plurality of helical springs, plugs screwed into the ends of said springs and seated in said openings, said plugs having grooves in their outer ends and a locking ring for each head engaging the grooves of the corresponding plugs and engaging corresponding grooves in the flanges.

In testimony whereof I affix my signature.

ALFRED WILLARD SHEPHERD.